United States Patent [11] 3,620,986

[72] Inventors Hans Joachim Diehr;
 Rudolf Merten; Helmut Piechota; Konrad Uhlig, all of Leverkusen, Germany
[21] Appl. No. 787,565
[22] Filed Dec. 27, 1968
[45] Patented Nov. 16, 1971
[73] Assignee Farbenfabriken Bayer Aktiengesellschaft Leverkusen, Germany
[32] Priority Jan. 2, 1968
[33] Germany
[31] P 17 20 768.0

[54] SYNTHETIC RESINS COMPRISING REACTION PRODUCTS OF ISOCYANATES AND PROCESS FOR THEIR PRODUCTION
7 Claims, No Drawings
[52] U.S. Cl. .................................................. 260/2.5 AW, 260/2.5 AC, 260/2.5 AQ, 260/18 TN, 260/75 NC, 260/75 NQ, 260/77.5 AC, 260/77.5 AQ
[51] Int. Cl. ......................................................... C08g 22/44, C08g 53/10
[50] Field of Search .......................................... 260/2.5 AW, 77.5 NC, 2.5 AC, 2.5 AQ, 2.5 AW, 75 TN, 75 T, 75 NC

[56] References Cited
UNITED STATES PATENTS

| | | | |
|---|---|---|---|
| 2,033,092 | 3/1936 | Bruson .......................... | 260/53 |
| 2,220,834 | 11/1940 | Bruson et al. ................. | 260/294.7 |
| 3,222,303 | 12/1965 | Hampson ..................... | 260/2.5 |
| 3,248,372 | 4/1966 | Bunge ........................... | 260/77.5 |

FOREIGN PATENTS

| | | | |
|---|---|---|---|
| 1,511,865 | 12/1967 | France .......................... | 260/2.5 |

OTHER REFERENCES
Dutch Patent Specification No. 67–05694 (15 pages) (10–23–67).

Primary Examiner—Donald E. Czaja
Assistant Examiner—H. S. Cockeram
Attorney—Robert A. Gerlach ABSTRACT: Synthetic resins which contain isocyanurate groups, especially foam materials are prepared by polymerization of compounds which contain more than one isocyanate group in the molecule in the presence of mononuclear Mannich bases of secondary amines, formaldehyde and phenols which Mannich bases are capable of incorporation in the polymer molecule and which contain, in addition to a substituted aminomethyl group and a phenolic OH group, at least one other group which contains hydrogen atoms which react with isocyanates.

SYNTHETIC RESINS COMPRISING REACTION PRODUCTS OF ISOCYANATES AND PROCESS FOR THEIR PRODUCTION

The polymerisation of compounds which contain aliphatic and aromatic isocyanate groups is already known and numerous variations of this reaction have been described. Alkaline catalysts are commonly used for this polymerisation. The catalyse conversion of the NCO groups into isocyanurate rings, this reaction being generally carried out in bulk or in solution, either to produce polymers which contain desired proportions of isocyanurate rings or to bring about complete reaction of the NCO groups present. If compounds which contain more than one isocyanate group in the molecule are used, these trimerisation reactions generally lead to formation of a completely cross-linked and brittle material under uncontrollable conditions. Another difficulty of these polymerisation reactions is that an incubation period is usually required, which makes it practically impossible to determine at what time the reaction commences. The polymerisation of the NCO groups, which proceeds exothermically, can only be started at room temperature when very active catalysts are used, although it is practically impossible then to control the reaction. For this reason, polymerisation reactions of this type are generally carried out using weak (basic) activators at elevated temperatures. Furthermore, polymerisation reactions using phenolic Mannich bases which are derived from phenol or thiophenol, substituted, if desired, by halogen atoms or alkyl radicals containing one to five carbon atoms, have already been described. In particular, the use of 2,4,6-tris-dimethylaminomethyl phenol, preferably, together with an epoxide in order to obtain a sufficiently high activity, has been described. The products obtained by this reaction, however, have a strong smell of amine which reduces their practical utility. Moreover, the amine components used cause the polymerisation reaction to proceed unevenly, thereby leading to formation of a product which is not generally commercially satisfactory.

The use of alkoxylated condensation products of amines, oxo compounds and phenols which contain at least two free o- and/or p-positions as polyhydroxyl compounds in the reaction with isocyanates, for example for the production of foams, is also known, although in these cases no substantial polymerisation of the isocyanate groups can be observed.

It has now been found, surprisingly, that synthetic resins based on polyisocyanates which possess advantageous properties for industrial use can be obtained be reacting a compound which contains more than one isocyanate group with catalysts which are Mannich bases of phenols and which are capable of being incorporated into the molecule and constitute mononuclear or polynuclear Mannich bases of secondary amines, preferably dimethylamine, formaldehyde and phenols which contain, in addition to the substituted aminomethyl group and the phenolic OH group, at least one other group which contains hydrogen atoms which are reactive with isocyanate groups, if desired in the presence of a blowing agent and if desired in the presence of less than equivalent amounts of compounds which contain active hydrogen atoms, optionally with the addition of stabilisers and the usual auxiliary agents.

According to the invention, therefore, the catalysts used contain free—OH,—SH, —COOH, $NH_2COO$, NH—, or—$NH_2$ groups in the molecule and can therefore be incorporated into the polymer during the polymerisation reaction at which time these groups undergo reaction. Compared with the catalysts previously described, these catalysts have a much fainter odor after they have been incorporated in the foam, as well as possessing greater catalytic activity. This is obviously due to the fact that the catalyst is converted by the reaction with the polyisocyanate into a form in which it is compatible with the polyisocyanate, so that the polymerisation reaction proceeds more smoothly. Catalysts which are strongly hydrophilic and incompatible must be used together with emulsifying agents or substances which have a similar action in order to achieve optimum activity.

The hydroxyl-containing Mannich bases of amino alcohols previously known showed practically no such activity in connection with the polymerisation reaction of the NCO groups because for this reaction the use of secondary amines, preferably dimethylamine is essential. Particularly active catalysts are obtained if the phenols which are used in their preparation contain at least two free o- and/or p-positions, and are condensed with approximately equal amounts of dimethylamine and an amino alcohol. In this reaction the presence of higher alkyl, cycloalkyl or aralkyl radicals as further substituents in the polyisocyanates is particularly important for increasing the initail compatibility of the catalysts.

It is therefore an object of this invention to provide a process for the production of synthetic resins. Another object of this invention is to provide a process for synthetic resins which contain isocyanurate groups. A further object of this invention is to provide foams containing isocyanurate groups. The foregoing objects and others which will become apparent from the following description are accomplished in accordance with this invention, generally speaking by providing a process for the production of synthetic resins which contain isocyanurate groups which comprises polymerisation of compounds which contain more than one isocyanate group in the molecule in the presence of mononuclear Mannich bases of secondary amines, formaldehyde and phenols, which Mannich bases are capable of incorporation in the polymer molecule and which contain, in addition to a substituted aminomethyl group and a phenolic OH-group, at least one other group which contains hydrogen atoms which react with isocyanates, optionally in the presence of blowing agents and optionally in the presence of less than equivalent amounts of compounds which contain active hydrogen atoms and of stabilizers.

The invention also provides synthetic resins which can be obtained by this process, in particular foam resins.

Suitable polyisocyanates are aliphatic and preferably aromatic, polyvalent isocyantes, e.g., alkylene diisocyanates such as tetra- and hexamethylene diisocyanate; arylene diisocyanates and their alkylation products such as phenylene diisocyanates, naphthylene diisocyanates, diphenylmethane diisocyanates, toluylene diisocyanates, di- and tri-isopropylbenzene diisocyanates and triphenylmethane triisocyanates; triesters of p-isocyanatophenyl-thiphosphoric acid; triesters of a p-isocyanatophenylphosphoric acid; aralkyl diisocyanates such as 1-(isocyanatophenyl-ethyl isocyanate or xylylene diisocyanates and polyisocyanates which may be substituted by a great variety of different substitutents such as alkoxy groups, nitro groups, and chlorine or bromine atoms. One may also use polyisocyanates which have been modified with less than equivalent quantities of polyhydroxyl compounds such as trimethylol propane, hexanetriol, glycerol or butanediol. The polyisocyanates which can be prepared in the manner described in French Pat. No. 1,565,833 may also be used as polyisocyanates in the process according to the invention. Those polyisocyanates which can be prepared by aniline-formaldehyde condensation followed by phosgenation are particularly desirable. One may also use isocyanates which have been modified by reaction with acetal, polymerised isocyanates which contain isocyanurate rings and high-molecular weight polyisocyanates which can be prepared by reacting monomeric polyisocyanates with high-molecular weight compounds which contain reactive hydrogen atoms, preferably high-molecular weight polyhydroxyl compounds, polycarboxyl and polyamino compounds. Mixtures of different isocyanates may, of course, also be used, in which case monoisocyanates such as phenyl isocyanate or naphthylisocyanate may be included in the reaction.

The polymerisation reaction of the isocyanate compound may be carried out in the presence of compounds which contain active hydrogen atoms. Water is preferably used, in which case an additional blowing effect may be achieved. One may also use any other organic compounds which contain several active hydrogen atoms. Suitable such compounds, which may be used either individually or in admixture, include, apart from polyamines and amino alcohols, in particular lower and higher molecular weight hydroxyl compounds or mixtures thereof. A wide variety of these compounds is used in the production of polyurethane resins. One may also use the usual mono- and polyhydric alcohols such as butanol, cyclohexanol, benzyl alcohol, ethylene glycol, propylene glycol, glycerol, trimethylolpropane and their products of addition with alkylene oxides such as ethylene oxide and/or propylene oxide. Suitable polyfunctional starting compounds for this purpose include the condensation products of the above-mentioned polyhydric alcohols with polycarboxylic acids such as adipic, sebacic, maleic, phthalic or terephthalic acid. Numerous compounds of this type have been described in "Polyurethanes, Chemistry and Technology," Volumes I and II, Saunders-Frisch, Interscience Publishers 1962 and 1964, and in Kunststoffhandbuch, Vol. VII, Vieweg-Hochtlen, Publishers Carl-Hanser-Verlag, Munich, 1966.

Homogeneous solids, lacquers, coatings, foams and cellular products can be obtained by the process. The process is preferably employed for the production of foams.

Foams are produced using water or additional blowing agents. Suitable blowing agents, apart from compounds which decompose to liberate gases such as nitrogen, e.g., azo compounds or sulphonyl azides, include, in particular, lower boiling hydrocarbons and their halogenation products, e.g. halogenated methanes or ethanes, chlorofluoromethanes, ethylene dichloride and vinylidene chloride.

The usual emulsifiers and foam stabilisers, e.g., higher alkyl or aryl sulfonic acids and their salts, sulfuric acid esters of castor oil or of ricinoleic acid and their salts, oleic or stearic acid salts, silicone oils which contain basic groups, and mixed condensation products which contain siloxane and alkylene oxide groups may be used as additives to facilitate the mixing and foaming steps.

The catalysts according to the invention are, for example, Mannich bases obtained by reacting phenols which contain at least two free o- and/or p-positions which are capable of undergoing condensation, formaldehyde and mixtures of dimethylamine and secondary amino alcohols. Furthermore, the catalysts used are mono- or polynuclear Mannich bases capable of being incorporated in the polymer molecule and are prepared from secondary amines, preferably dimethylamine, formaldehyde and phenols, which contain at least one group which contains hydrogen atoms which are reactive with isocyanates in addition to the substituted amino methyl group and the phenolic OH group. The hydrogen atoms which react with isocyanates are present, for example, in the groups OH, COOH, $NH_2COO$, $NH_2$, NHR (R=alkyl, cycloalkyl, aryl, aralkyl) and SH.

The following compounds are suitable phenols for use in the preparation of the catalysts: Phenol, cresols, xylenols, isooctyl-, isononyl-, isododecyl- and cyclohexyl-phenols in which the alkyl substituents or cycloalkyl substituents are in the o-position or, preferably, in the p-position; phenylethylphenols which are obtained by reacting phenol with styrene; polyphenols such as hydroquinone and 4,4'-dihydroxydiphenylmethane, salicyclic acid and its salts, and hydroxyalkyl esters of salicyclic acid, salicyclic acid amide and saligenin hydroxyalkylether.

Suitable secondary amino alcohols include, in particular, dialkanolamines such as diethanolamine and dipropanolamine, as well as N-alkylalkanolamines such as N-methyl, N-ethyl, or N-butylethanolamine. Aminocarboxylic acids such as alanine (or its salts), polyamines such as 1,3 -propylene diamine, diethylene triamine or aminothiols may also be used for the condensation reaction with the phenols.

The proportion of secondary amino alcohol, amino carboxylic acid (or its salt), polyamine or aminothiol to the dimethylamine is advantageously so chosen that at least one catalytically active dimethylaminomethyl group and at least one group which can be incorporated into the molecule and which contains hydrogen atoms which are reactive with isocyanates are introduced per molecule. In this case of monosubstituted phenols, this is achieved by using equal molecular proportions of dimethylamine and the secondary amino alcohol, aminocarboxylic acid (or its salt), diamine or aminothiol, whereas, if phenol itself is used, 33 to 66 mols percent of dimethylamine should be used. Catalysts which contain other functional groups, e.g., those derived from salicylic acid amide, are prepared in analogous manner by the Mannich reaction with formaldehyde and the secondary amine, especially dimethylamine.

The phenolic component and other components used in the preparation of the catalyst may, of course, be used in the form of their mixtures, provided that the appropriate precautions required when using mixtures of monosubstituted phenols and phenol itself are used. The amount of formaldehyde to be used is determined by the number of groups capable of condensation which are present in the phenol used. Mononuclear Mannich bases are obtained if the quantity of formaldehyde used is equal to the quantity of amine used, whereas polynuclear catalysts are obtained by suitable reduction of the amine content if larger quantities of formaldehyde are used. For example, a condensation product which statistically has a binuclear structure is obtained from 2 mols of p-isononylphenol, 1 mol of dimethylamine and 1 mol of diethanolamine with 3 mols of formaldehyde.

The condensation of the phenol, secondary amine and formaldehyde is carried out, e.g., by the methods described in U.S. Pat. Nos. 2,033,092 and 2,220,834.

The usual catalysts employed in isocyanate chemistry, e.g., organic metal compounds such as lead or tin salts, inorganic and organic polybasic metal salts as well as tertiary amines such as dimethylbenzylamine or endoethylene piperazine may be used in addition to the catalysts used according to the invention. IR spectroscopic analyses show that varying amounts of carbodiimide structures are formed in the foam products depending on the conditions, especially on the reaction temperatures reached, and the proportion present in the foam products can be increased by adding the catalysts customarily used for the production of carbodiimides, especially tetravalent and pentavalent organic phosphorus compounds such as phospholines, phospholine oxides, tertiary phosphines, (cyclic) esters, amides and ester amides of phosphorous and phosphoric acid. Further details of emulsifiers, catalysts, etc. which may be used in the process according to the invention can be found, e.g. in "Polyurethanes, Chemistry and Technology," Volumes I and II, Saunders-Frisch, Interscience Publishers, 1962 and 1964.

The production of the foams is carried out by the usual and well-known method of mixing the reaction components and then pouring them out into suitable moulds, preferably mechanically. The amount of blowing agents used in this process is determined by the desired bulk density. Between 1 and 100, preferably between 5 and 50 parts by weight of a fluorochloromethane or a corresponding amount of some other blowing agent, based on the isocyanate component, are generally used. Bulk densities of between 15 and 200 kg./m.$^3$ or more, preferably between 20 and 200 kg./m.$^3$ are generally desired.

The quantity of compounds which contain reactive hydrogen atoms used is generally so chosen that a sufficient quantity of free isocyanate groups is still available for the polymerisation reaction. The quantity should preferably be so chosen that at least 50 percent and preferably over 70 percent of total quantity of isocyanate put into the process is available for the polymerisation reaction. The quantity of catalyst used is largely determined by its structure, there being no relationship between its nitrogen content and its catalytic activity. A guide to the amount to be used is provided by the activity test described below. Between 0.5 and 15 percent by weight of catalyst component, based on the isocyanate component, can generally be used. The usual auxiliary agents such as pigments, dyes, plasticisers and flameproofing agents such as antimony compounds, phosphorus compounds or halogen compounds, may be added in addition to the essential components used in the production of the synthetic resins.

In the same way, the production of lacquers and solid products is carried out by methods which in principle are already known. Lacquers may be applied with solvents to all types of different substrates such as wood, glass, metal or paper, if desired after the addition of the usual auxiliary agents for lacquers, and pigments. Condensation may also be completed at elevated temperatures. Solid products are produced by pouring the polyisocyanates or polyisocyanate mixtures to which catalyst has been added into moulds, if desired with cooling or subsequent heating.

IR spectroscopic examination of the synthetic resins, lacquers, coatings and foams obtained show the presence of high proportions of isocyanurate rings in addition to small proportions of carbodiimide groups.

A. Determination of the activity:

The temperature of 25 parts by weight of toluylene-2,4-diisocyanate is adjusted to 20° C. and 0.1 ml. of a catalyst (generally liquid) is added with shaking. The mixture is then shaken for another 5 seconds and the change of temperature within that time is then determined. The characteristic measurements taken are the times required for the mixtures to reach temperatures of 50° C. and 75° C. In this activity test, 2,4,6-tris-dimethylaminomethylphenol reaches a temperature of 50° C. after 175 seconds and 75° C. after 200 seconds.

B. Preparation of the catalysts to be used general method of procedure:

Phenol, the required quantity of dimethylamine in the form of 25 percent aqueous solution and the required quantity of alkanolamine are placed in a reaction vessel at about 25° C. and the required quantity of formaldehyde, generally in the form of a 40 percent aqueous solution, is then introduced dropwise over a period of 30 minutes. The reaction mixture is then heated for about one hour at 30° C. and the temperature is increased to 80° C. over a period of 2 hours. After 2 hours at 80° C., the organic phase is separated from the aqueous by the addition of sodium chloride and the organic phase is concentrated by evaporation at 70° C./12 mm. Hg. The organic phase may be need to be freed from inorganic constituents by filtration after it has been concentrated by evaporation. Alternatively, removal of the aqueous phase by the addition of sodium chloride may be omitted and the reaction product may be concentrated directly at 70° by 80° C./12 mm. Hg.

Details of the quantities to be used, yields and properties of the reaction products are given in the following table.

Examples 1–4
General method of procedure 100.0 Parts by weight of a polyaryl-polymethylene polyisocyanate obtained by aniline-formaldehyde condensation followed by phosgenation are added to a mixture of 6.0 parts by weight of catalyst, 15.0 parts by weight of monofluorotrichloromethane and 1.0 part by weight of a polysiloxane polyether copolymer and the reaction mixture is intensively mixed with an electrically driven stirrer and poured into prepared moulds made of packing paper.

The reaction times and properties of the resulting polyisocyanurate foams are given in table 2.

Examples 5–8

100.0 Parts by weight of a polyaryl-polymethylenepolyisocyanate obtained by aniline-formaldehyde condensation followed by phosgenation are stirred together with a mixture of 6 parts by weight of catalyst, 15 parts by weight of monofluorotrichloromethane, 1 part by weight of polysiloxane polyether copolymer and 10 parts by weight of a sucrose/propylene oxide polyether of OH number 380. The reaction mixture is then poured into paper moulds.

The reaction times and properties of the resulting foams are shown in table 3.

TABLE 2

| Example | Catalyst | $t_R$ | $t_A$ | $t_S$ | $t_K$ | Surface | Cellular character | Bulk density, kg./m.³ |
|---|---|---|---|---|---|---|---|---|
| 1 | B1 | 20 | 150 | 240 | 300 | Slightly brittle | Very fine | 43 |
| 2 | B2 | 30 | 35 | 55 | 40 | do | Medium fine | 49 |
| 3 | B3 | 25 | 55 | 85 | 64 | do | Very fine | 51 |
| 4 | B4 | 50 | 90 | 125 | 110 | do | do | 61 |

TABLE 3

| Example | Catalyst | $t_R$ | $t_A$ | $t_S$ | $t_K$ | Surface | Cellular character | Bulk density, kg./m.³ |
|---|---|---|---|---|---|---|---|---|
| 5 | B1 | 15 | 90 | 190 | 235 | Less brittle | Medium fine | 37 |
| 6 | B2 | 60 | 85 | 110 | 125 | do | Very fine | 41 |
| 7 | B3 | 60 | 90 | 120 | 200 | do | do | 45 |
| 8 | B4 | 60 | 130 | 160 | 270 | do | do | 47 |

Remarks: $t_R$=stirring time; $t_A$=setting time (internal); $t_S$=rising time; $t_K$=setting time (external). (Assessment of the surface is carried out 24 hours after production of the product.)
See remarks following Table 2.

Example 9

50 Parts by weight of the isocyanate described in example 1 are mixed with 1 part by weight of the catalyst obtained according to B 2 and placed in a mould which is kept closed and under pressure to effect complete condensation and form a homogeneous shaped product. (The reaction is completed by subsequent heating at 80° C. for 2 hours.) An almost incombustible synthetic resin of high strength is obtained.

Example 10

25 Parts by weight of a biuret diisocyanate obtained from 3 mols of hexamethylene diisocyanate and 1 mol of water are dissolved in 25 parts by weight of a solvent mixture of equal parts of ethyl acetate, butyl acetate and glycol monomethyl ether acetate and are then treated with 2 parts by weight of the catalyst obtained in B 3 and applied to glass, paper and fabric. The reaction is completed by subsequent heating at 80° C. (2 hours). Substantially incombustible coating is obtained.

What is claimed is:

1. A process for the production of synthetic resins which contain isocyanurate groups which comprises polymerizing an organic polyisocyanate in the presence of a catalytic amount of Mannich bases of secondary amines, formaldehyde and

TABLE 1

| No. | Parts by weight of phenol | Parts by weight of dimethyl-amine (in 25% aqueous form) | Parts by weight of ethanolamine | Parts by weight of CH₂O (in the form of a 40% aqueous solution) | Parts by weight of yield | CP²⁵ | Activity after (seconds)— 50° C. | 75° C. |
|---|---|---|---|---|---|---|---|---|
| B1 | 188 phenol | 180 | 150 N-methylethanolamine | 180 | 533 | 11,490 | 125 | 240 |
| B2 | 220 isononylphenol (1) | 45 | 105 diethanolamine | 60 | 298 | 242 | 23 | 30 |
| B3 | do | 45 | 75 N-methylethanolamine | 60 | 301 | 1,962 | 50 | 100 |
| B4 | 440 isononylphenol (1) | 45 | 105 diethanolamine | 90 | 548 | 9,810 | 90 | 120 | phenols, which Mannich bases are capable of being incorporated into the polymer molecule and which contain, in addition to a substituted aminomethyl group, wherein both aminohydrogens are substituted, and a phenolic OH group, at least one other group which contains active hydrogen atoms according to the Zerewitinoff Test said active hydrogen-containing group selected from the group consisting of OH, COOH, $NH_2COO$, $NH_2$, SH and NHR wherein R is alkyl, cycloalkyl, aryl or aralkyl.

2. The process according to claim 1 wherein the polymerization of polyisocyanates is carried out the presence of a blowing agent.

3. The process according to claim 1 wherein Mannich bases based on dimethylamine as the secondary amine are used.

4. The process according to claim 1 wherein Mannich bases based on mixtures of dimethylamine and secondary amino alcohols are used.

5. The process according to claim 1 wherein the Mannich bases are present in an amount of from 0.5 percent to about 15 percent by weight of the organic polyisocyanate.

6. The process according to claim 1 wherein the polymerization is carried out in the presence of less than equivalent amounts of compounds containing active hydrogen atoms reactive with isocyanates.

7. The process according to claim 2 wherein the polymerization is carried out in the presence of foam stabilizers.

* * * * *